(12) United States Patent
Isono

(10) Patent No.: US 7,304,807 B2
(45) Date of Patent: Dec. 4, 2007

(54) TAKING LENS SYSTEM

(75) Inventor: Masashi Isono, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 967 days.

(21) Appl. No.: 10/425,900

(22) Filed: Apr. 30, 2003

(65) Prior Publication Data

US 2004/0021957 A1    Feb. 5, 2004

(30) Foreign Application Priority Data

| Jul. 30, 2002 | (JP) | ............................. 2002-220692 |
| Sep. 19, 2002 | (JP) | ............................. 2002-272939 |
| Nov. 15, 2002 | (JP) | ............................. 2002-331617 |
| Jan. 30, 2003 | (JP) | ............................. 2003-022132 |
| Jan. 30, 2003 | (JP) | ............................. 2003-022180 |
| Jan. 31, 2003 | (JP) | ............................. 2003-023100 |

(51) Int. Cl.
*G02B 13/18* (2006.01)
*G02B 9/12* (2006.01)

(52) U.S. Cl. ...................... 359/716; 359/791

(58) Field of Classification Search ................ 359/717, 359/708, 726, 727, 733, 716, 791
See application file for complete search history.

(56) References Cited

U.S. PATENT DOCUMENTS 6,476,982 B1 *  11/2002  Kawakami ................. 359/791

2002/0145811 A1 * 10/2002  Omura ....................... 359/727

FOREIGN PATENT DOCUMENTS

| JP | 02-006917 | 1/1990 |
| JP | 07-325254 | 12/1995 |
| JP | 07-333502 | 12/1995 |
| JP | 08-050240 | 2/1996 |
| JP | 08-129133 | 5/1996 |
| JP | 08-160298 | 6/1996 |
| JP | 08-313804 | 11/1996 |
| JP | 11-023966 | 1/1999 |
| JP | 11-149041 | 6/1999 |
| JP | 2000-180719 | 6/2000 |
| JP | 2001-272598 | 10/2001 |
| JP | 2002-098889 | 4/2002 |
| JP | 2002-228922 | 8/2002 |
| JP | 2003-322792 | 11/2003 |

OTHER PUBLICATIONS

Japanese Office Action dated Nov. 7, 2006 (with English Translation).

* cited by examiner

*Primary Examiner*—Scott J. Sugarman
(74) *Attorney, Agent, or Firm*—Buchanan Ingersoll & Rooney PC

(57) ABSTRACT

A taking lens system for forming an image on a solid-state image sensor has, from the object side, two positive lens elements and at least one negative lens element. The most image-side lens surface is an aspherical surface concave to the image side, and this aspherical surface has a point of inflection.

3 Claims, 12 Drawing Sheets

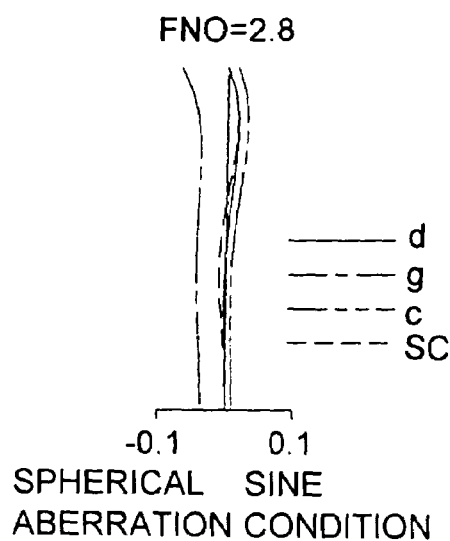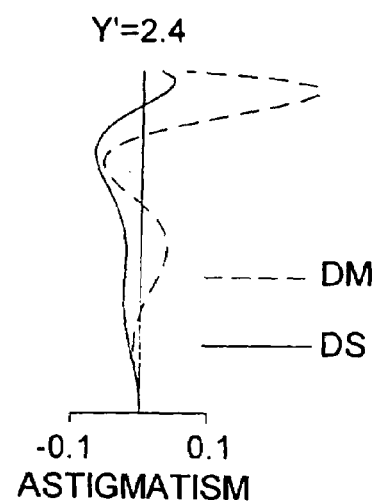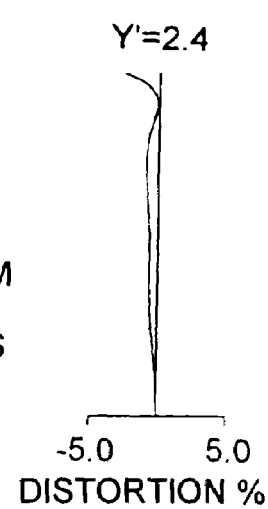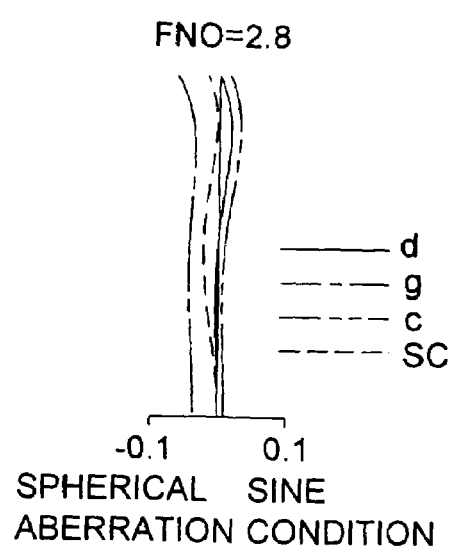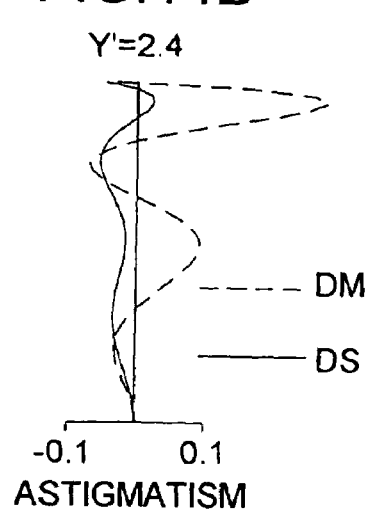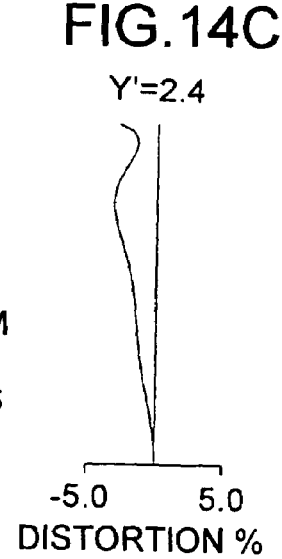

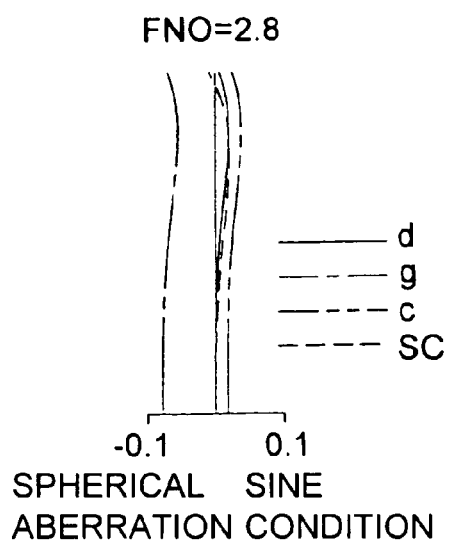
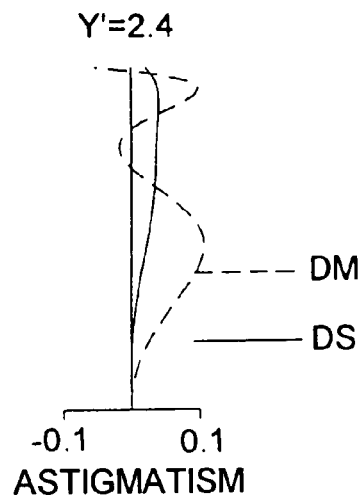
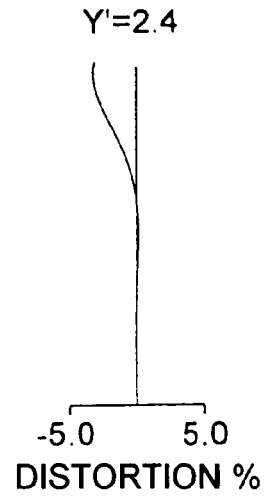
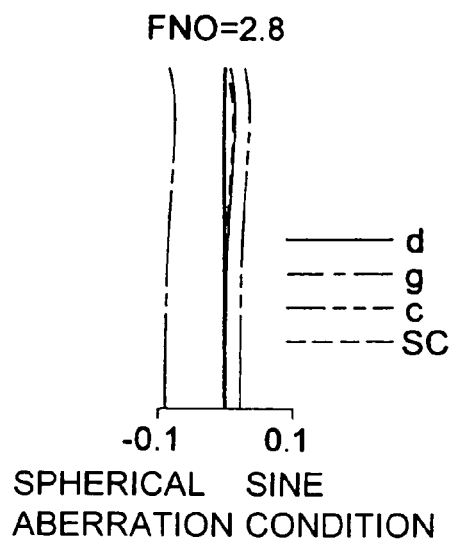
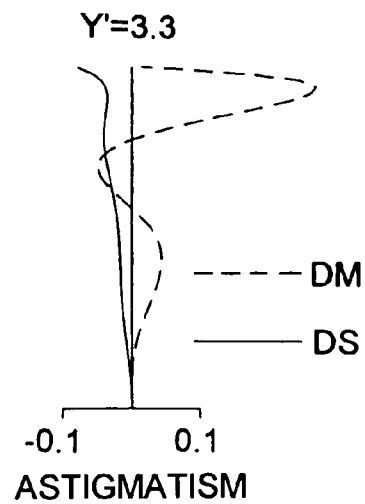
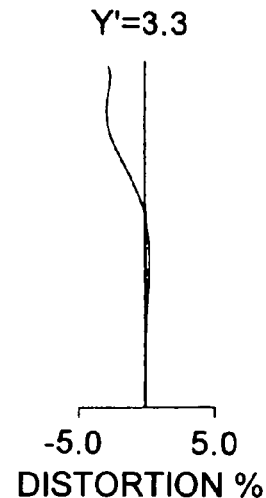

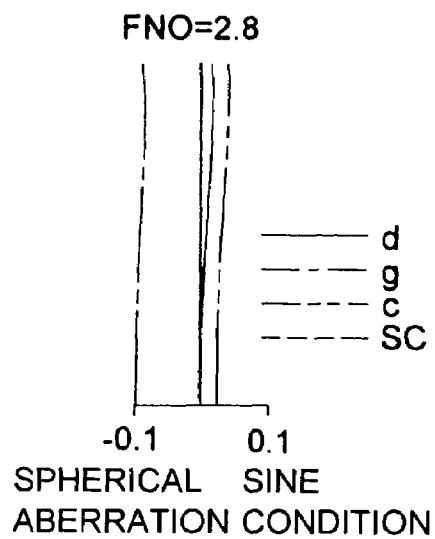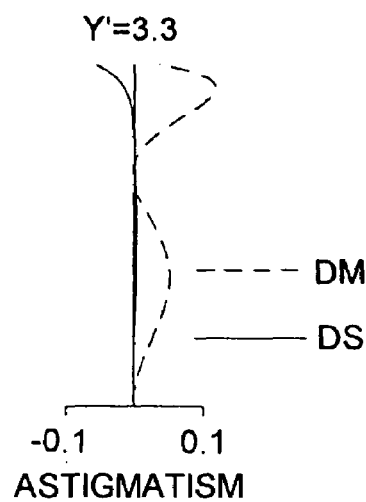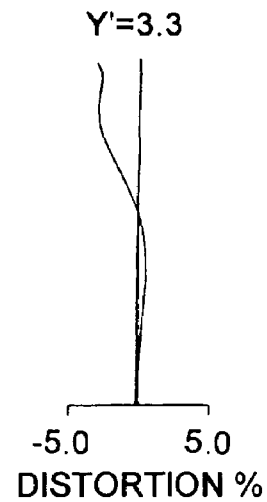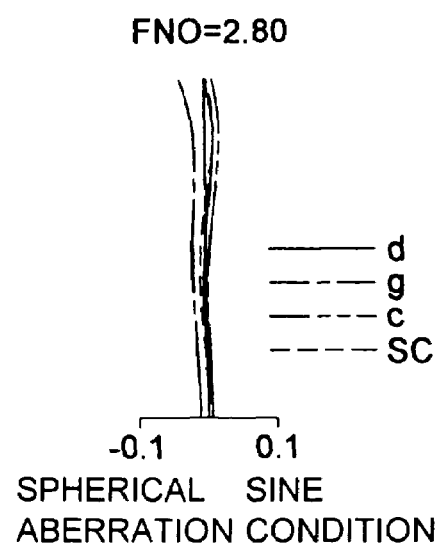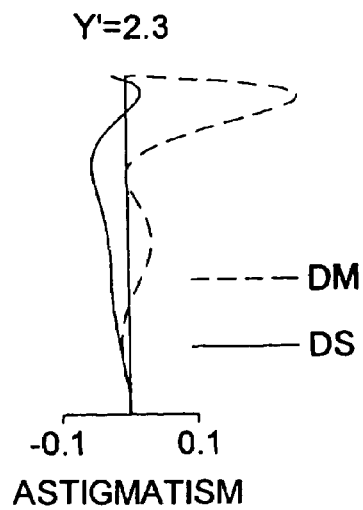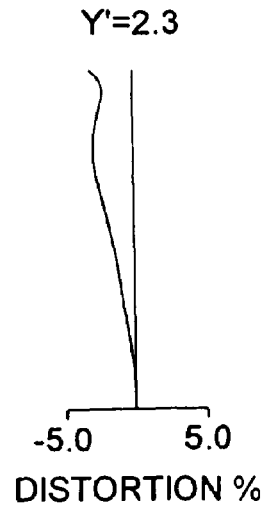

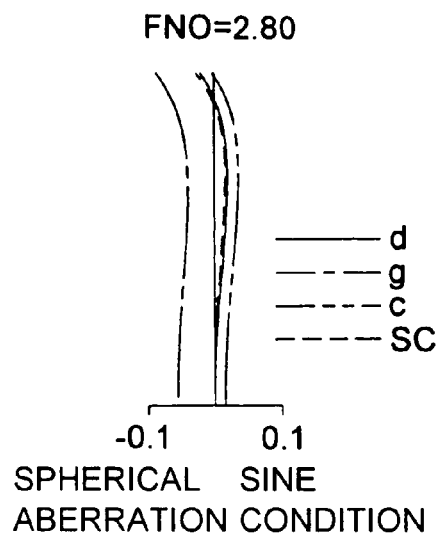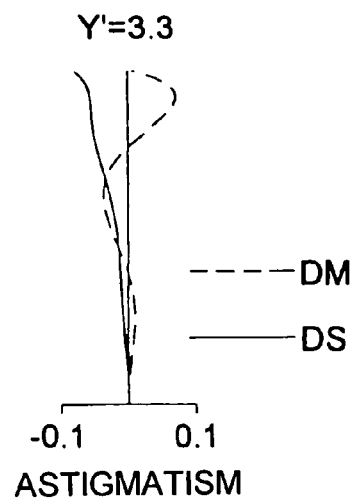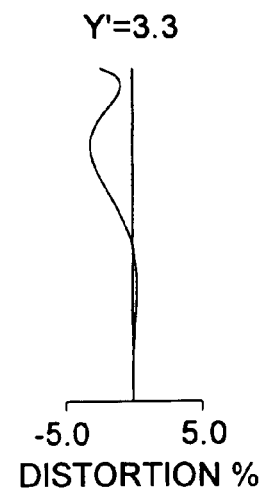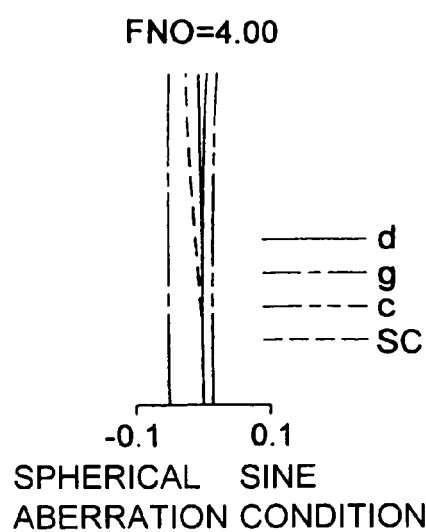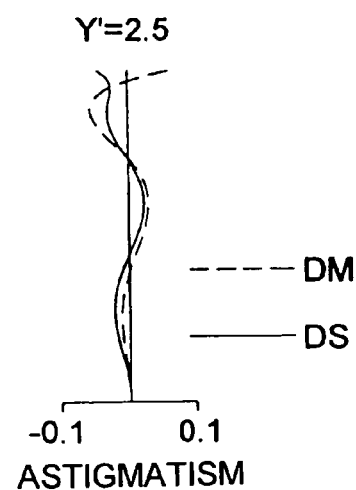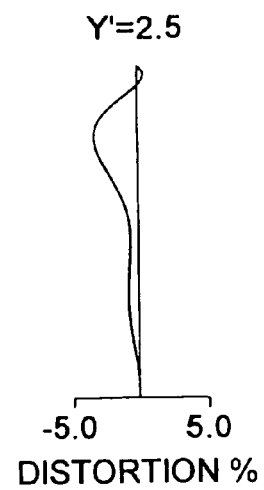

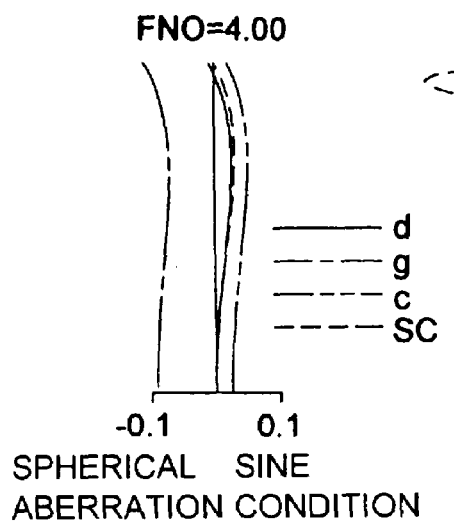
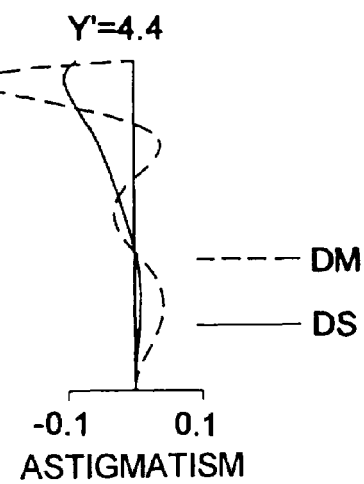
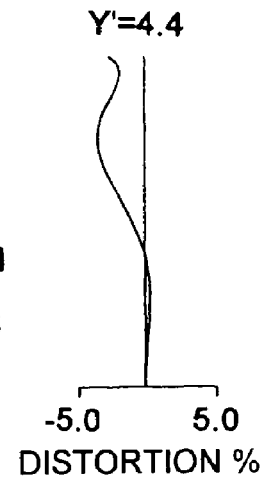
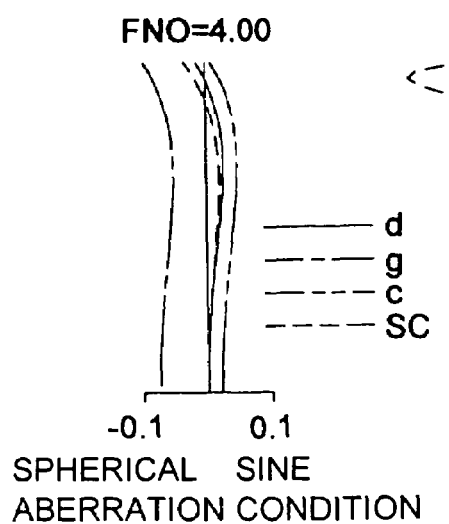
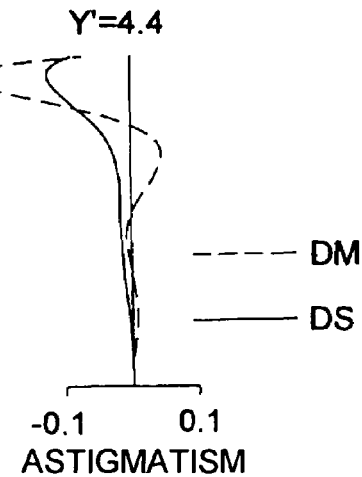
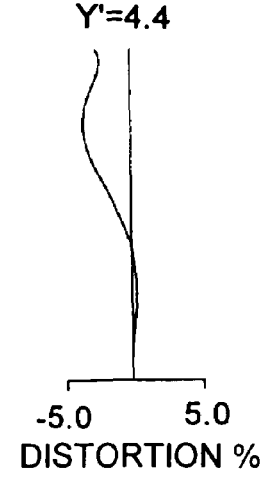

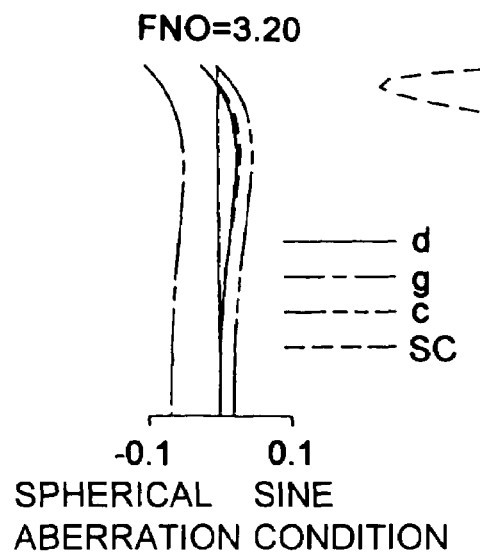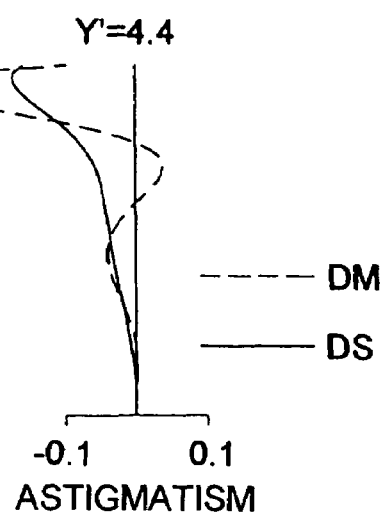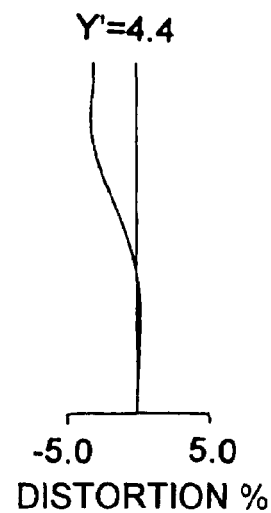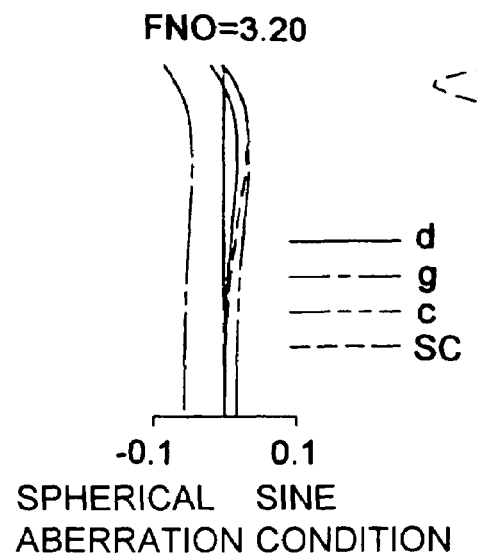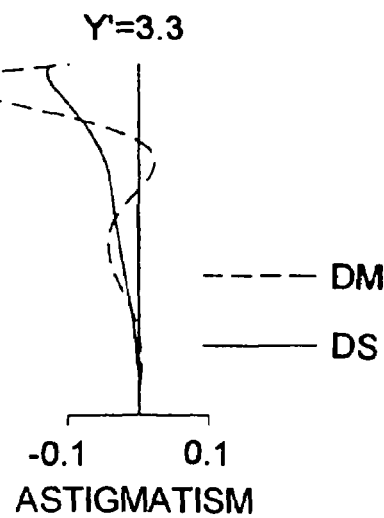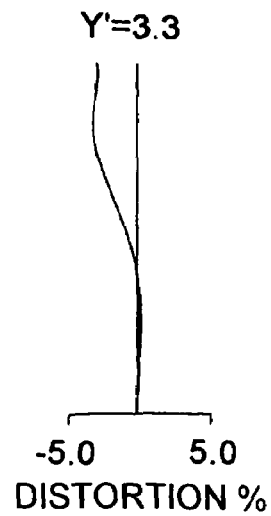

TAKING LENS SYSTEM

This application is based on the following Japanese Patent Applications, the contents of which are hereby incorporated by reference:

Japanese Patent Application No. 2002-220692 filed on Jul. 30, 2002

Japanese Patent Application No. 2002-272939 filed on Sep. 19, 2002

Japanese Patent Application No. 2002-331617 filed on Nov. 15, 2002

Japanese Patent Application No. 2003-022132 filed on Jan. 30, 2003

Japanese Patent Application No. 2003-022180 filed on Jan. 30, 2003

Japanese Patent Application No. 2003-023100 filed on Jan. 31, 2003

BACKGROUND OF THE INVENTION

1. Field of the Invention

The present invention relates to a taking lens system, and more particularly to a compact taking lens system suitable for use in a digital input apparatus (such as a digital still camera or digital video camera) that takes in an image of a subject by means of a solid-state image sensor.

2. Description of the Prior Art

In recent years, as personal computers and the like become more and more popular, digital still cameras and digital video cameras (hereinafter collectively referred to as "digital cameras"), which permit easy entry of image data into digital equipment, have been becoming more and more popular for personal use among general users. Such digital cameras are expected to become even more widespread in the future.

Solid-state image sensors, such as CCDs (charge-coupled devices), used in digital cameras have been made increasingly small, and accordingly further miniaturization is sought in digital cameras themselves. As a result, miniaturization is eagerly sought also in taking lens systems, which occupy the largest volumes in digital input devices. The easiest way to make a taking lens system smaller is to make a solid-state image sensor smaller. However, this involves making photosensitive elements smaller, and thus makes the solid-state image sensor more difficult to fabricate, and in addition requires higher performance in the taking lens system.

On the other hand, making a taking lens system smaller while keeping the size of a solid-state image sensor unchanged inevitably brings the exit pupil position closer to the image plane. When the exit pupil position is brought closer to the image plane, the off-axial rays exiting from the taking lens system are obliquely incident on the image plane. This makes it impossible to make the most of the light-condensing ability of the microlenses provided in front of the solid-state image sensor, with the result that the obtained image shows extremely uneven brightness between in a central portion and in a peripheral portion thereof. This can be avoided by bringing the exit pupil position of the taking lens system farther away from the image plane, but this inevitably makes the taking lens system as a whole unduly large.

Furthermore, in keen competition for lower prices in recent years, lower costs have been increasingly eagerly sought in taking lens systems. Moreover, to cope with the trend toward denser and denser solid-state image sensors in recent years, increasingly high performance has been sought in taking lens systems. To meet these requirements, Japanese Patent Applications Laid-Open Nos. 2000-180719 and 2002-228922.

However, the taking lens system proposed in Japanese Patent Application Laid-Open No. 2000-180719 mentioned above has an angle of view of 50 degrees or smaller, which is insufficient for it to be used as a taking lens system. On the other hand, the taking lens system proposed in Japanese Patent Application Laid-Open No. 2002-228922 has an angle of view of 60 degrees or larger, which is sufficient for it to be used as a taking lens system. However, this taking lens system has an aperture stop disposed in a front portion thereof, and therefore its performance at the periphery of the image it forms tends to be greatly affected by manufacturing errors. This makes it difficult to maintain satisfactory performance at the periphery of the image formed. Moreover, the taking lens systems proposed in both of the publications mentioned above are composed of, from the object side, a positive lens element and a negative lens element. Arranging a negative lens element in a front portion of a taking lens system in this way makes it difficult to make the taking lens system compact.

SUMMARY OF THE INVENTION

An object of the present invention is to provide a taking lens system for use with a solid-state image sensor which is low-cost and compact but which nevertheless offers satisfactory optical performance.

To achieve the above object, according to one aspect of the present invention, a taking lens system for forming an image on a solid-state image sensor is provided with, from the object side, two positive lens elements and at least one negative lens element. Here, the most image-side lens surface is an aspherical surface concave to the image side, and this aspherical surface has a point of inflection.

According to another aspect of the present invention, a taking lens system for forming an image on a solid-state image sensor is provided with, from the object side, a positive lens element, an aperture stop, and a lens unit composed of at least one lens element. Here, the most image-side lens element within the lens unit is a negative lens element concave to the image side. This negative lens element has an aspherical surface on the image side thereof, and this aspherical surface has a point of inflection.

According to still another aspect of the present invention, a taking lens system for forming an image on a solid-state image sensor is provided with, from the object side, a positive lens element, an aperture stop, and a lens unit composed of at least one lens element. Here, the most image-side lens surface within the lens unit is an aspherical surface concave to the image side, and this aspherical surface has a point of inflection. Moreover, the following condition is fulfilled:

$$1.1 < f/Y' < 1.9$$

where f represents the focal length of the entire taking lens system; and

Y' represents the maximum image height.

BRIEF DESCRIPTION OF THE DRAWINGS

This and other objects and features of the present invention will become clear from the following description, taken in conjunction with the preferred embodiments with reference to the accompanying drawings in which:

FIGS. 13A to 13C are aberration diagrams of Example 1;
FIGS. 14A to 14C are aberration diagrams of Example 2;
FIGS. 15A to 15C are aberration diagrams of Example 3;
FIGS. 16A to 16C are aberration diagrams of Example 4;
FIGS. 17A to 17C are aberration diagrams of Example 5;
FIGS. 18A to 18C are aberration diagrams of Example 6;
FIGS. 19A to 19C are aberration diagrams of Example 7;
FIGS. 20A to 20C are aberration diagrams of Example 8;
FIGS. 21A to 21C are aberration diagrams of Example 9;
FIGS. 22A to 22C are aberration diagrams of Example 10;
FIGS. 23A to 23C are aberration diagrams of Example 11; and
FIGS. 24A to 24C are aberration diagrams of Example 12.

DESCRIPTION OF THE PREFERRED EMBODIMENTS

Figure 1:
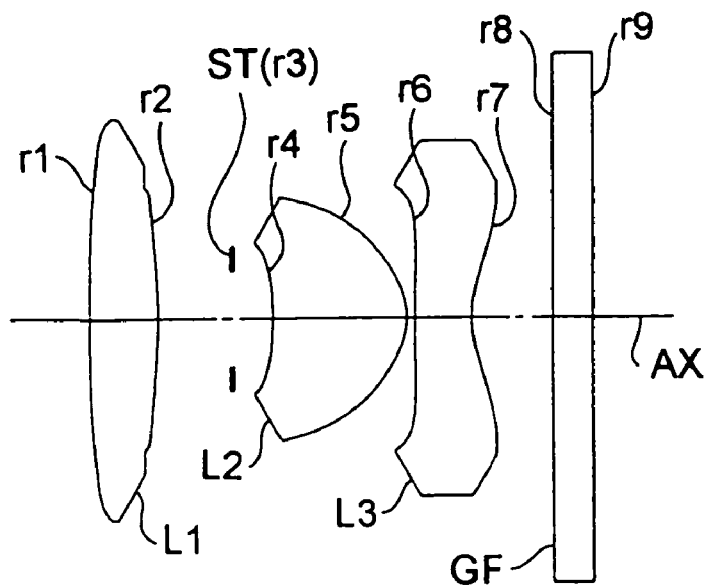
FIG. 1 is a lens construction diagram of a first embodiment (Example 1) of the invention.
Figure 2:
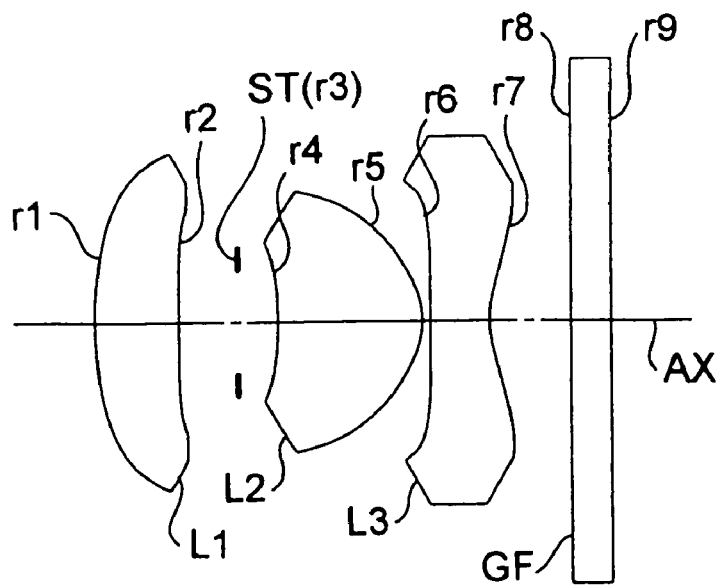
FIG. 2 is a lens construction diagram of a second embodiment (Example 2) of the invention.
Figure 3:
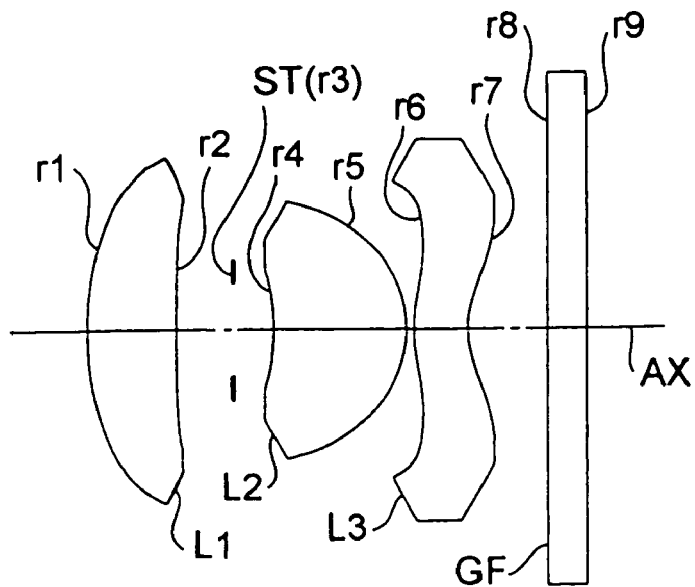
FIG. 3 is a lens construction diagram of a third embodiment (Example 3) of the invention.
Figure 4:
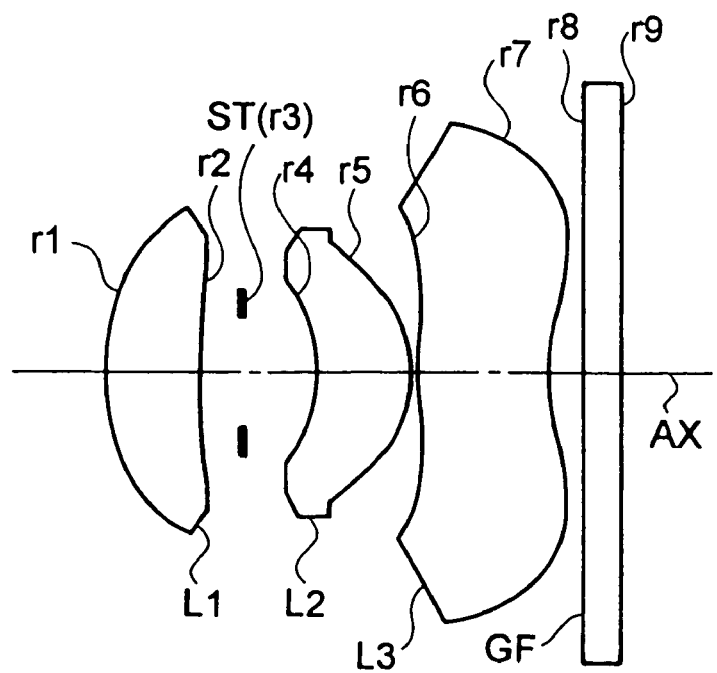
FIG. 4 is a lens construction diagram of a fourth embodiment (Example 4) of the invention.
Figure 5:
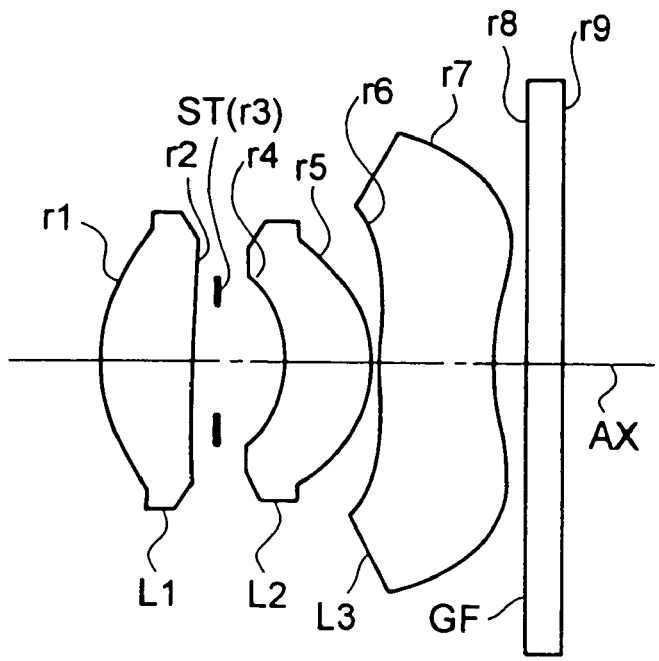
FIG. 5 is a lens construction diagram of a fifth embodiment (Example 5) of the invention.

Hereinafter, taking lens systems embodying the present invention will be described with reference to the drawings. FIGS. 1 to 5 show the lens constructions of a first to a fifth embodiment, respectively, of the invention, as seen in an optical section. The taking lens systems of the first to fifth embodiments are all single-focal-length lens systems designed for image taking purposes (for example, in a digital camera), i.e., for forming an optical image on a solid-state image sensor (for example, a CCD). In these embodiments, the taking lens system is composed of three lens elements, namely, from the object side thereof, a first lens element L1 having a positive optical power, an aperture stop ST, a second lens element having a positive optical power, and a third lens element having a negative optical power. All of the three lens elements L1 to L3 are plastic lens elements, and all the lens surfaces r1, r2, and r4 to r7 are aspherical surfaces. Moreover, on the image side of the third lens element L3, there is disposed a glass filter GF having parallel flat surfaces and corresponding to an optical low-pass filter or the like.

In the first and second embodiments (FIGS. 1 and 2), the first lens element L1 has a weak positive optical power (it is to be noted that an optical power is a quantity given as the reciprocal of a focal length), the second lens element L2 has a positive meniscus shape convex to the image side, and the third lens element L3 has a negative meniscus shape concave to the image side. In this way, here, a lens type with a positive-positive-negative optical power arrangement is adopted by disposing, from the object side, a first lens element L1, which is a positive lens element having a weak optical power, a aperture stop ST, a second lens element L2, which is a positive meniscus lens element convex to the image side, and a third lens element L3, which is a negative meniscus lens element concave to the image side. This is preferable to achieve a proper balance between the optical performance, cost, and compactness of the taking lens system.

In the third to fifth embodiments (FIGS. 3 to 5), the first lens element L1 has a positive optical power, the second lens element L2 has a positive meniscus shape convex to the image side, and the third lens element L3 has a negative meniscus shape concave to the image side. In this way, here, a lens type with a positive-positive-negative optical power arrangement is adopted by disposing, from the object side, a first lens element L1, which is a positive lens element, an aperture stop ST, a second lens element L2, which is a positive meniscus lens element convex to the image side, and a third lens element L3, which is a negative meniscus lens element concave to the image side. This is preferable to achieve a proper balance between the optical performance, cost, and compactness of the taking lens system.

As described above, in the first to fifth embodiments, all of the first to third lens elements L1 to L3 are plastic lens elements, and all the lens surfaces r1, r2, and r4 to r7 are aspherical surfaces. It is preferable that, in this way, all the lens elements L1 to L3 be plastic lens elements and that all the lens elements L1 to L3 each have at least one aspherical surface. Using plastic lens elements as all the lens elements L1 to L3 is effective in reducing the cost of the taking lens system, and using at least one aspherical surface on each of the lens elements L1 to L3 is effective for the correction of spherical aberration, coma, and distortion.

Figure 6:
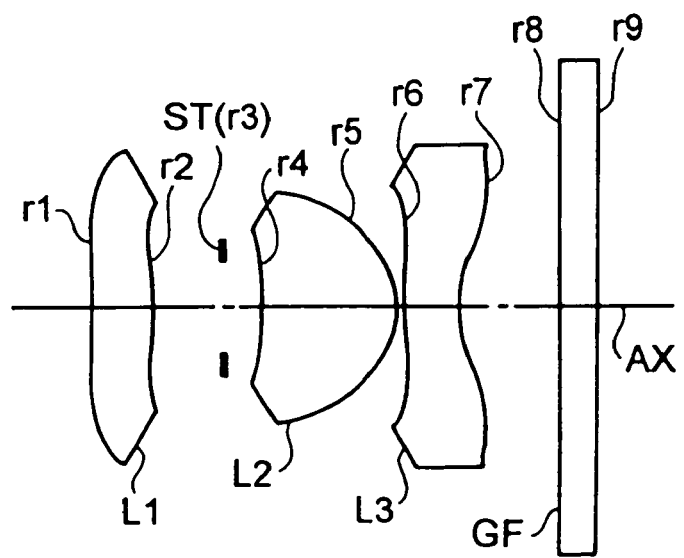
FIG. 6 is a lens construction diagram of a sixth embodiment (Example 6) of the invention.
Figure 7:
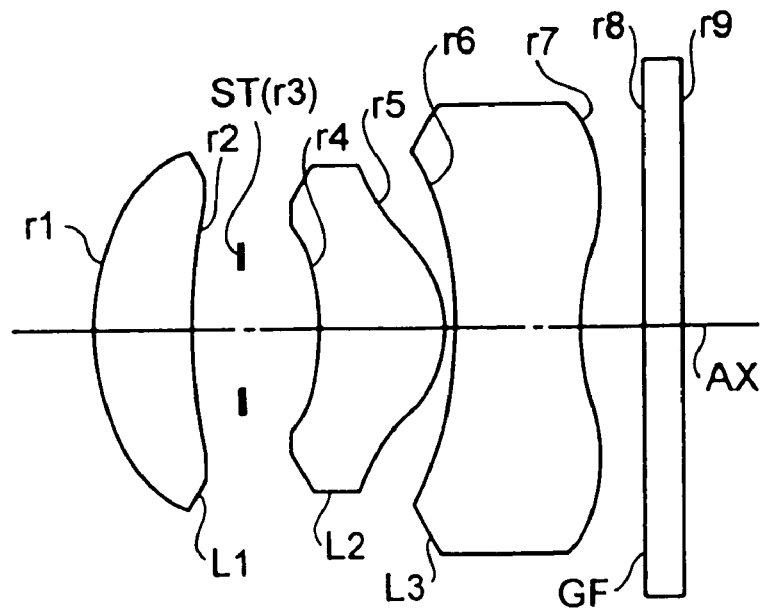
FIG. 7 is a lens construction diagram of a seventh embodiment (Example 7) of the invention.
Figure 8:
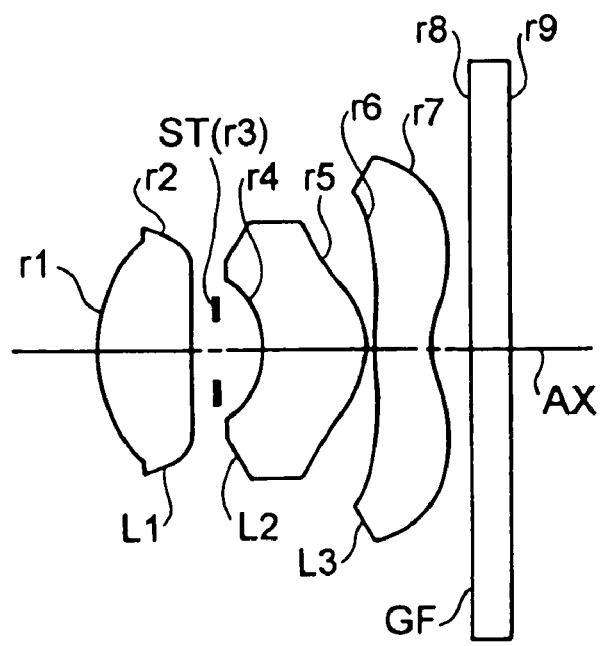
FIG. 8 is a lens construction diagram of an eighth embodiment (Example 8) of the invention.
Figure 9:
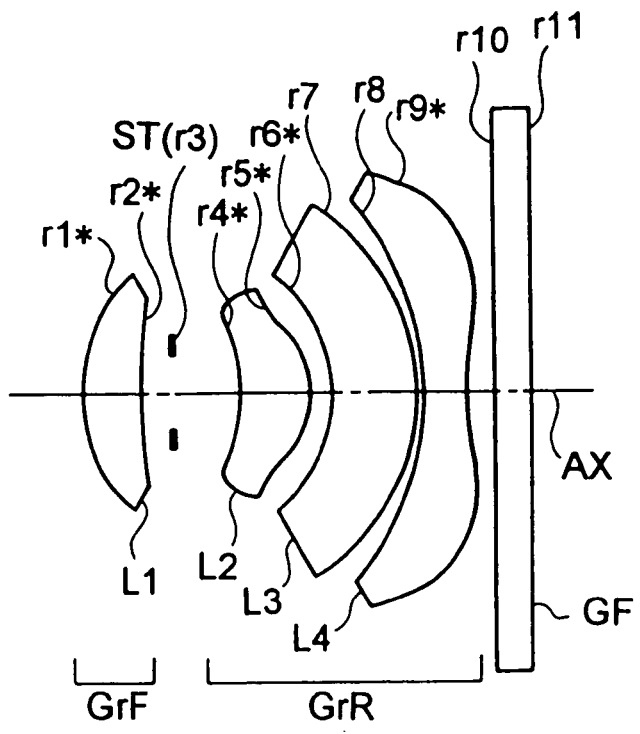
FIG. 9 is a lens construction diagram of a ninth embodiment (Example 9) of the invention.
Figure 10:
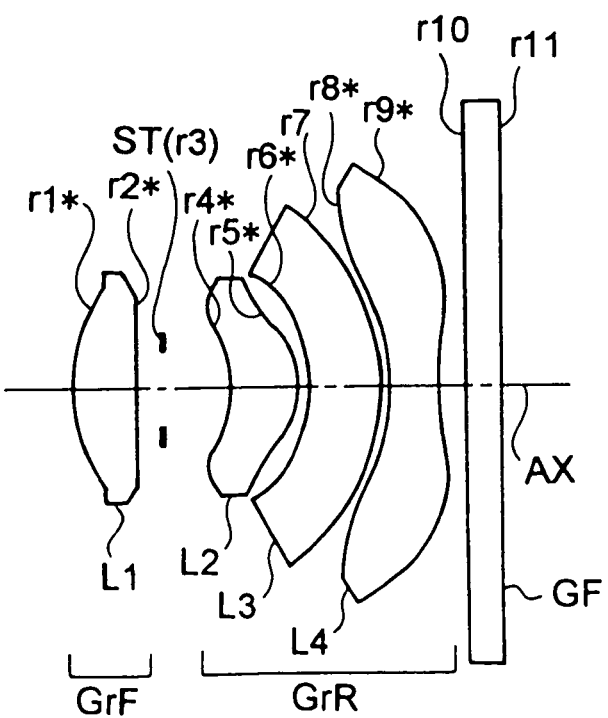
FIG. 10 is a lens construction diagram of a tenth embodiment (Example 10) of the invention.
Figure 11:
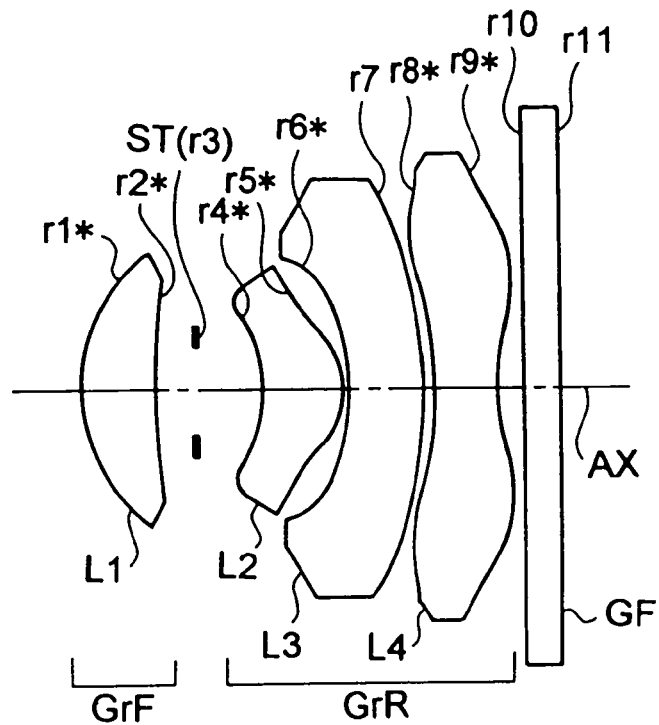
FIG. 11 is a lens construction diagram of an eleventh embodiment (Example 11) of the invention.
Figure 12:
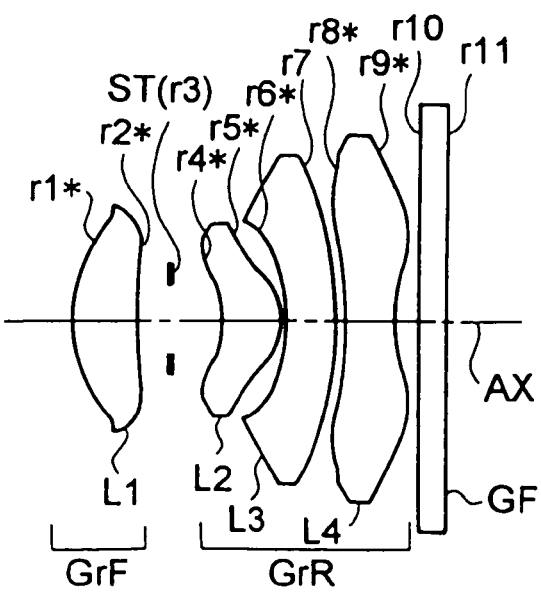
FIG. 12 is a lens construction diagram of a twelfth embodiment (Example 12) of the invention.

Next, other taking lens systems embodying the invention that adopt a positive-positive-negative lens type will be described with reference to the drawings. FIGS. 6 to 8 show the lens constructions of a sixth to an eighth embodiment, respectively, of the invention, as seen in an optical section. The taking lens systems of the sixth to eighth embodiments are all single-focal-length lens systems designed for image taking purposes (for example, in a digital camera), i.e., for forming an optical image on a solid-state image sensor (for example, a CCD). In these embodiments, the taking lens system is composed of three lens elements, namely, from the object side thereof, a first lens element L1 having a positive optical power, an aperture stop ST, a second lens element having a positive optical power, and a third lens element having a negative optical power and concave to the image side. Moreover, on the image side of these, there is disposed a glass filter GF having parallel flat surfaces and corresponding to an optical low-pass filter or the like. In the sixth to eighth embodiments, all the lens surfaces r1, r2, and r4 to r7 are aspherical surfaces.

The lens constructions of the sixth to eighth embodiments will be described in more detail below. In the sixth embodiment, the first lens element L1 is a plastic lens element having a positive meniscus shape convex to the image side, the second lens element L2 is a glass lens element having a positive meniscus shaped convex to the image side, and the third lens element L3 is a plastic lens element having a negative meniscus shape concave to the image side. In the seventh embodiment, the first lens element L1 is a glass lens element having a positive meniscus shape convex to the object side, the second lens element L2 is a plastic lens element having a positive meniscus shape convex to the image side, and the third lens element L3 is a negative plastic lens element having a biconcave shape. In the eighth embodiment, the first lens element L1 is a glass lens element having a positive meniscus shape convex to the object side, the second lens element L2 is a plastic lens element having a positive meniscus shape convex to the image side, and the third lens element L3 is a plastic lens element having a negative meniscus shape concave to the image side.

In taking lens systems like those of the sixth to eighth embodiments that adopt a lens type with a positive-positive-negative optical power arrangement, by using a glass lens element as one of the first and second lens elements L1 and L2 and a plastic lens element as the other, and using a plastic lens element concave to the image side as the third lens element L3, it is possible to achieve a proper balance between the exit pupil position, optical performance, cost, compactness, and productivity required in a taking lens system for use with a solid-state image sensor.

Next, taking lens systems embodying the invention that adopt a positive-positive-negative-negative lens type will be described with reference to the drawings. FIGS. 9 to 12 show the lens constructions of a ninth to an twelfth embodiment, respectively, of the invention, as seen in an optical section. The taking lens systems of the ninth to twelfth embodiments are all single-focal-length lens systems designed for image taking purposes (for example, in a digital camera), i.e., for forming an optical image on a solid-state image sensor (for example, a CCD). In these embodiments, the taking lens system is composed of, from the object side, a front lens unit GrF having a positive optical power, an aperture stop ST, and a rear lens unit GrR having a negative or positive optical power. Moreover, on the image side of these, there is disposed a glass filter GF having parallel flat surfaces and corresponding to an optical low-pass filter or the like. The front lens unit GrF is composed solely of a first lens element L1, which is a positive lens element. The rear lens unit GrR is composed of three lens elements, namely, from the object side, a second lens element L2, which is a positive lens element, a third lens element L3, which is a negative lens element, and a fourth lens element L4, which is a negative lens element. That is, in the ninth to twelfth embodiments, the taking lens element is composed of four lens elements, namely, from the object side, a first lens element L1 having a positive optical power, an aperture stop ST, a second lens element L2 having a positive optical power, a third lens element L3 having a negative optical power, and a fourth lens element L4 having a negative optical power. In the lens construction diagrams (FIGS. 9 to 12), ri (i=1, 2, 3, . . . ) represents the i-th surface from the object side, and a surface of which the symbol ri is marked with an asterisk (*) is an aspherical surface.

The lens constructions of the ninth to twelfth embodiments will be described in more detail below. In the ninth to eleventh embodiments, the first lens element L1 is a positive glass lens element having a meniscus shape convex to the object side, second lens element L2 is a positive plastic lens element having a meniscus shape convex to the image side, the third lens element L3 is a negative plastic lens element having a meniscus shape convex to the image side, and fourth lens element L4 is a negative plastic lens element having a biconcave shape. Here, the front lens unit GrF has a positive optical power, and the rear lens unit GrR has a negative optical power. In the twelfth embodiment, the first lens element L1 is a positive glass lens element having a biconvex shape, the second lens element L2 is a positive plastic lens element having a meniscus shape convex to the image side, the third lens element L3 is a negative plastic lens element having a meniscus shape convex to the image side, and the fourth lens element L4 is a negative plastic lens element having a biconcave shape. Here, the front lens unit GrF and the rear lens unit GrR both have a positive optical power.

In the ninth to twelfth embodiments, a four-lens-element construction is adopted by disposing, from the object side, a positive lens element convex to the object side, an aperture stop ST, a positive meniscus lens element convex to the image side, and a negative meniscus lens element convex to the image side, and a negative lens element concave to the image side and having an aspherical surface at least on the image side thereof. This makes it possible to achieve high optical performance and an appropriate exit pupil position and simultaneously make the taking lens system compact and low-cost. Moreover, in the ninth to twelfth embodiments, glass and plastic lens elements are arranged appropriately; specifically, only the first lens element L1 is a glass lens element and all the other lens elements L2 to L4 are plastic lens elements. This helps realize a low-cost, compact taking lens system that offers satisfactory optical performance. Moreover, by using a glass lens element only as the first lens element L1, it is possible to alleviate degradation of performance resulting from variation in temperature and thereby obtain satisfactory optical performance over a wide range of temperatures.

By adopting the lens type of the first to eighth embodiments (composed of three, i.e., a positive, a positive, and a negative, lens elements) or the lens type of the ninth to twelfth embodiments (composed of four, i.e., a positive, a positive, a negative, and a negative, lens elements), that is, by adopting a lens type that includes three or more lens elements that are, from the object side, a positive, a positive, and a negative lens element, it is possible to overcome the problems encountered in the taking lens systems proposed in the patent publications mentioned earlier. Specifically, it is possible to appropriately arrange lens elements to achieve satisfactory compactness and simultaneously optimize the shape of the last lens surface to locate the exit pupil farther away. This makes it possible to realize a taking lens system for use with a solid-state image sensor which is low-cost and compact but which nevertheless offers satisfactory optical performance. The characteristic features of such a taking lens system will be described in detail below.

The taking lens systems of the first to twelfth embodiments are all characterized in that they are designed for forming an image on a solid-state image sensor, that they include, from the object side, two positive lens elements (corresponding to the first and second lens elements L1 and L2) and at least one negative lens element (corresponding to the third and fourth lens elements L3 and L4), that their most image-side lens surface is an aspherical surface concave to the image side, and that this aspherical surface has a point of inflection. The aspherical surface of the most image-side lens surface is, as will be understood from its sectional shape shown in the lens construction diagrams, so shaped as to be concave in a portion thereof near the optical axis AX and convex in a middle to a peripheral portion thereof The point at which this aspherical surface changes its shape from concave to convex is the point of inflection.

By making the lens surface concave to the image side in a portion thereof near the optical axis AX as described above, it is possible to reduce the total length of the taking lens system. If the lens surface is made concave all over its surface, the exit pupil at the periphery will be located too close. By making the lens surface convex in a middle to a peripheral portion thereof, it is possible to locate the exit pupil farther away. The convex shape in the middle to peripheral portions of the lens surface is achieved by the aspherical surface concave to the image side having a point of inflection. By using a characteristically shaped aspherical surface like this as the most image-side lens surface, it is possible to realize a taking lens system that has an exit pupil located far away despite having a small total length. Moreover, by adopting an arrangement of lens elements having, from the object side, a positive, a positive, and a negative optical power, it is possible to more effectively reduce the total length of the taking lens system.

In the constructions described above, the best position at which to place an aperture stop is between the first and second lens elements L1 and L2. That is, it is preferable that, as in the first to twelfth embodiments, a taking lens system be composed of, from the object side, a positive lens element (corresponding to the first lens element L1), an aperture stop ST, and a lens unit composed of at least one lens element (corresponding to the second and third lens elements L2 and L3 or the second to fourth lens elements L2 to L4), that the most image-side lens element within that lens unit be a negative lens element concave to the image side (corresponding to the third or fourth lens element L3 and L4), that this negative lens element have an aspherical surface on the image side thereof, and that this aspherical surface have a point of inflection. In a taking lens system of a front-aperture type, an aperture stop is disposed on the object side of the first lens element. This causes the heights at which peripheral rays pass through individual lens elements to vary extremely greatly, and thus makes the taking lens system highly sensitive to manufacturing errors, letting them cause serious degradation in optical performance. On the other hand, in a taking lens system of a rear-aperture type, an aperture stop is disposed on the image side of the most image-side lens element (i.e., the last lens element). This makes the exit pupil extremely close, and thus makes the taking lens system unfit for use with a solid-state image sensor. The position of the aperture stop that achieves the optimum balance between the sensitivity to manufacturing errors and the position of the exit pupil is between the first and second lens elements L1 and L2.

It is preferable that a taking lens system be composed of, from the object side, a positive lens element (corresponding to the first lens element L1), an aperture stop ST, and a lens unit composed of at least one lens element (corresponding to the second and third lens elements L2 and L3 or the second to fourth lens elements L2 to L4), that the most image-side lens surface within that lens unit be an aspherical surface concave to the image side, that this aspherical surface have a point of inflection, and in addition that conditional formula (I) below be fulfilled.

$$1.1 < f/Y' < 1.9 \tag{1}$$

where f represents the focal length of the entire taking lens system; and

Y' represents the maximum image height.

Conditional formula (1) defines the conditional range that should preferably be fulfilled to achieve a proper balance between the total length of the taking lens system and the front lens diameter. Transgressing the lower limit of conditional formula (1) results in an unduly large front lens diameter. This makes the taking lens system unduly large in the radial direction, and makes correction of distortion difficult. By contrast, transgressing the upper limit of conditional formula (1) results in an unduly great total length of the optical system. This makes the taking lens system unduly large in the axial (AX) direction.

It is further preferable that conditional formula (1a) below be fulfilled, and it is particularly preferable that conditional formula (1b) below be fulfilled. Conditional formulae (1a) and (1b) define further preferable conditional ranges within that defined by conditional formula (1) above from the aforementioned and other viewpoints.

$$1.3 < f/Y' < 1.8 \tag{1a}$$

$$1.4 < f/Y' < 1.7 \tag{1b}$$

It is preferable that, as in the first to twelfth embodiments, all the lens elements each have at least one aspherical surface. Providing at least one aspherical surface on each of the first to third lens elements L1 to L3 or the first to fourth lens elements L1 to L4 is highly effective in correcting spherical aberration, coma, and distortion. In the first to twelfth embodiments, the taking lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, in a taking lens system embodying the invention, it is preferable to use lens elements formed out of a uniform material as all of the lens elements.

As required, in addition to the aperture stop ST, a beam restricting plate or the like for cutting unnecessary light may be arranged. As required, a kind of prism (for example, a rectangular prism), a kind of mirror (for example, a flat mirror), or the like may be arranged in the optical path so as to bend, with a surface thereof having no optical power (for example, a reflective, refractive, or diffractive surface) the optical path in front of, behind, or in the middle of the taking lens system (for example, the beam may be reflected so that the optical axis AX is bent by about 90 degrees). Where to bend the optical path may be determined to suit particular needs. By bending the optical path appropriately, it is possible to make apparently slim and compact the digital input apparatus (such as a digital camera) in which the taking lens system is incorporated.

The taking lens systems of the first to twelfth embodiments are all suitable as compact taking lens systems for use in digital input apparatuses, and, by combining one of those taking lens systems with an optical low-pass filter and a solid-state image sensor, it is possible to build a taking lens device that takes in an image of a subject optically and outputs it as an electrical signal. A taking lens device is used as the main component of a camera that is used to take a still or moving picture of a subject, examples of such cameras including digital cameras, video cameras, and cameras incorporated in or externally fitted to digital video units, personal computers, mobile computers, cellular phones, personal digital assistants (PDAs), peripheral apparatuses therefor (for example, mouses, scanners, printers, and other digital input/output apparatuses), and the like. A taking lens device is composed of, for example, from the object (subject) side, a taking lens system for forming an optical image of a subject, an optical filter such as an optical low-pass filter or an infrared cut filter, and a solid-state image sensor for converting the optical image formed by the taking lens system into an electrical signal.

Thus, the first to twelfth embodiments described hereinbefore include inventions (I) to (V) having features as noted below, and, with those features, it is possible to realize high-optical-performance, low-cost, compact taking lens devices. By incorporating such a taking lens device in a digital camera or the like, it is possible to enhance the performance and functionality of the camera, and to reduce the costs and size thereof.

(I) A taking lens device comprising a taking lens system for forming an optical image and an image sensor for converting the optical image formed by the taking lens system into an electrical signal, wherein the taking lens system is composed of, from the object side, two positive lens elements and at least one negative lens element, the most image-side lens surface being an aspherical surface concave to the image side, the aspherical surface having a point of inflection.

(II) A taking lens device comprising a taking lens system for forming an optical image and an image sensor for converting the optical image formed by the taking lens system into an electrical signal, wherein the taking lens system is composed of, from the object side, a positive lens element, an aperture stop, and a lens unit composed of at least one lens element, the most image-side lens element within the lens unit being a negative lens element concave to the image side, the negative lens element having an aspherical surface on the image side thereof, the aspherical surface having a point of inflection.

(III) A taking lens device comprising a taking lens system for forming an optical image and an image sensor for converting the optical image formed by the taking lens system into an electrical signal, wherein the taking lens system is composed of, from the object side, a positive lens element, an aperture stop, and a lens unit composed of at least one lens element, the most image-side lens surface within the lens unit being an aspherical surface concave to the image side, the aspherical surface having a point of inflection, and at least one of conditional formulae (1), (1a), and (1b) noted earlier is fulfilled.

(IV) A taking lens device as described in one of (I) to (III) above, wherein all the lens elements each have at least one aspherical surface.

(V) A taking lens device as described in one of (I) to (IV) above, wherein all the lens elements are each formed out of a uniform material.

Used as the image sensor is, for example, a solid-state image sensor such as a CCD or CMOS (complementary metal oxide semiconductor) sensor having a plurality of pixels. The optical image formed by the taking lens system is converted into an electrical signal by the solid-state image sensor. The optical image to be formed by the taking lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal. The signal produced by the solid-state image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal. In the embodiments, a glass filter GF is used as the optical low-pass filter disposed between the last surface of the taking lens system and the solid-state image sensor. It is possible, however, to use instead an optical low-pass filter of any other type that suits the digital input apparatus in which the taking lens system is incorporated. For example, it is possible to use a birefringence-type low-pass filter made of quartz or the like having an appropriately aligned crystal axis, a phase-type low-pass filter that achieves the required optical cut-off frequency characteristics by exploiting diffraction, or a low-pass filter of any other type.

EXAMPLES

Hereinafter, practical examples of taking lens systems embodying the present invention will be presented with reference to their construction data and other data. Tables 1 to 12 show the construction data of Examples 1 to 12, respectively. Examples 1 to 12 correspond to the first to twelfth embodiments described hereinabove. Thus, the lens construction diagrams (FIGS. 1 to 12) of the first to twelfth embodiments also show the lens constructions of Examples 1 to 12, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. Shown together with these data are the focal length (f, mm) of the taking lens system as a whole and the f-number (FNO). Table 13 shows the values of the conditional formulae as actually observed in Examples 1 to 12.

A surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below. The aspherical surface data of the aspherical surfaces used in each example are also shown together with the other data mentioned above.

$$X(H)=(C0 \cdot H^2)/(1+\sqrt{1-\epsilon \cdot C0^2 \cdot H^2})+\Sigma(Ai \cdot H^i) \qquad (AS)$$

where
- $X(H)$ represents the displacement along the optical axis AX at the height H (relative to the vertex);
- H represents the height in a direction perpendicular to the optical axis AX;
- C0 represents the paraxial curvature (=the reciprocal of the radius of curvature);
- $\epsilon$ represents the quadric surface parameter; and
- Ai represents the aspherical surface coefficient of i-th order (the data are omitted if Ai=0).

FIGS. 13A to 13C, 14A to 14C, 15A to 15C, 16A to 16C, 17A to 17C, 18A to 18C, 19A to 19C, 20A to 20C, 21A to 21C, 22A to 22C, 23A to 23C, and 24A to 24C, are aberration diagrams of Examples 1 to 12, respectively. Of these aberration diagrams, those with their numbers suffixed with "A" show spherical aberration and sine condition, those with their numbers suffixed with "B" show astigmatism, and those with their numbers suffixed with "C" show distortion, with FNO representing the f-number and Y' representing the maximum image height (mm). In the diagrams showing spherical aberration, the solid line (d), dash-and-dot line (g), and dash-dot-dot line (c) represent the spherical aberration (mm) observed for the d-, g-, and c-lines, respectively, and the broken line (SC) represents the deviation (mm) from the sine condition. In the diagrams showing astigmatism, the broken line (DM) and the solid line (DS) represent the astigmatism (mm) observed for the d-line on the meridional and sagittal planes, respectively. In the diagrams showing distortion, the solid line represents the distortion (%) observed for the d-line.

As described above, according to the present invention, it is possible to realize a taking lens system for use with a solid-state image sensor which is low-cost and compact but which nevertheless offers satisfactory optical performance. By incorporating a taking lens system according to the invention in a digital input apparatus such as a camera incorporated in a cellular phone or a digital camera, it is possible to enhance the performance and functionality of the apparatus, and to reduce the costs and size thereof.

TABLE 1

Example 1
f = 3.507, FNO = 2.8

| Radius of Curvature | Axial Distance | Refractive Index | Abbe Number |
|---|---|---|---|
| r1* = 68.391 | d1 = 0.872 | N1 = 1.53048 | ν1 = 55.72 (L1) |
| r2* = −6.304 | d2 = 0.938 | | |
| r3 = ∞ (ST) | d3 = 0.500 | | |
| r4* = −3.703 | d4 = 1.649 | N2 = 1.53048 | ν2 = 55.72 (L2) |
| r5* = −0.852 | d5 = 0.100 | | |
| r6* = 11.946 | d6 = 0.700 | N3 = 1.58340 | ν3 = 30.23 (L3) |
| r7* = 1.225 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = 0.51000 \times 10^2$, $A4 = 0.56767 \times 10^{-2}$, $A6 = 0.35339 \times 10^{-2}$, $A8 = -0.16790 \times 10^{-2}$, $A10 = 0.18541 \times 10^{-3}$
Aspherical Surface Data of Surface r2

$\epsilon = 0.15652 \times 10^2$, $A4 = 0.29585 \times 10^{-1}$, $A6 = 0.49258 \times 10^{-2}$, $A8 = -0.68370 \times 10^{-2}$, $A10 = 0.21683 \times 10^{-2}$
Aspherical Surface Data of Surface r4

$\epsilon = 0.14877 \times 10$, $A4 = -0.79140 \times 10^{-1}$, $A6 = -0.47628 \times 10^{-1}$, $A8 = 0.48397 \times 10^{-1}$, $A10 = -0.11082$
Aspherical Surface Data of Surface r5

$\epsilon = -0.10000 \times 10$, $A4 = -0.10074 \times 10^{-1}$, $A6 = -0.10146$, $A8 = 0.69391 \times 10^{-1}$, $A10 = -0.22979 \times 10^{-1}$
Aspherical Surface Data of Surface r6

$\epsilon = 0.21028 \times 10$, $A4 = -0.38111 \times 10^{-1}$, $A6 = 0.40875 \times 10^{-2}$, $A8 = 0.27790 \times 10^{-2}$, $A10 = -0.24091 \times 10^{-2}$
Aspherical Surface Data of Surface r7

$\epsilon = -0.60000 \times 10$, $A4 = -0.45478 \times 10^{-1}$, $A6 = 0.20696 \times 10^{-1}$, $A8 = -0.67145 \times 10^{-2}$, $A10 = 0.63538 \times 10^{-3}$

TABLE 2

Example 2
f = 4.046, FNO = 2.8

| Radius of Curvature | Axial Distance | Refractive Index | Abbe Number |
|---|---|---|---|
| r1* = 5.219 | d1 = 1.013 | N1 = 1.53048 | ν1 = 55.72 (L1) |
| r2* = −64.896 | d2 = 0.748 | | |
| r3 = ∞ (ST) | d3 = 0.500 | | |

TABLE 2-continued

| | | | |
|---|---|---|---|
| r4* = −4.392 | d4 = 1.756 | N2 = 1.53048 | ν2 = 55.72 (L2) |
| r5* = −0.904 | d5 = 0.100 | | |
| r6* = 20.088 | d6 = 0.725 | N3 = 1.58340 | ν3 = 30.23 (L3) |
| r7* = 1.208 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = -0.70781 \times 10$, $A4 = 0.89349 \times 10^{-2}$, $A6 = 0.47221 \times 10^{-2}$, $A8 = -0.10936 \times 10^{-2}$, $A10 = 0.26309 \times 10^{-3}$
Aspherical Surface Data of Surface r2

$\epsilon = -0.14000 \times 10^2$, $A4 = 0.21091 \times 10^{-1}$, $A6 = 0.65881 \times 10^{-2}$, $A8 = -0.31253 \times 10^{-2}$, $A10 = 0.14822 \times 10^{-2}$
Aspherical Surface Data of Surface r4

$\epsilon = 0.21386 \times 10$, $A4 = -0.36204 \times 10^{-1}$, $A6 = -0.25647 \times 10^{-1}$, $A8 = 0.63204 \times 10^{-1}$, $A10 = -0.70302 \times 10^{-1}$
Aspherical Surface Data of Surface r5

$\epsilon = -0.97822$, $A4 = 0.29364 \times 10^{-1}$, $A6 = -0.10042$, $A8 = 0.61685 \times 10^{-1}$, $A10 = -0.15831 \times 10^{-1}$
Aspherical Surface Data of Surface r6

$\epsilon = -0.20000 \times 10$, $A4 = -0.46735 \times 10^{-1}$, $A6 = 0.63444 \times 10^{-2}$, $A8 = 0.57281 \times 10^{-2}$, $A10 = -0.26912 \times 10^{-2}$
Aspherical Surface Data of Surface r7

$\epsilon = -0.60000 \times 10$, $A4 = -0.60010 \times 10^{-1}$, $A6 = 0.24137 \times 10^{-1}$, $A8 = -0.56437 \times 10^{-2}$, $A10 = 0.43112 \times 10^{-3}$

TABLE 3

Example 3
f = 4.057, FNO = 2.8

| Radius of Curvature | Axial Distance | Refractive Index | Abbe Number |
|---|---|---|---|
| r1* = 3.887 | d1 = 1.137 | N1 = 1.53048 | ν1 = 55.72 (L1) |
| r2* = 50.974 | d2 = 0.745 | | |
| r3 = ∞ (ST) | d3 = 0.500 | | |
| r4* = −3.040 | d4 = 1.696 | N2 = 1.53048 | ν2 = 55.72 (L2) |
| r5* = −1.374 | d5 = 0.100 | | |
| r6* = 1.971 | d6 = 0.700 | N3 = 1.58340 | ν3 = 30.23 (L3) |
| r7* = 1.157 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = -0.17782 \times 10$, $A4 = 0.61057 \times 10^{-2}$, $A6 = 0.14542 \times 10^{-2}$, $A8 = -0.49868 \times 10^{-3}$, $A10 = 0.16559 \times 10^{-3}$
Aspherical Surface Data of Surface r2

$\epsilon = 0.16000 \times 10^2$, $A4 = 0.61220 \times 10^{-2}$, $A6 = -0.75168 \times 10^{-3}$, $A8 = 0.15948 \times 10^{-2}$, $A10 = -0.17231 \times 10^{-4}$
Aspherical Surface Data of Surface r4

$\epsilon = 0.84433$, $A4 = 0.61538 \times 10^{-2}$, $A6 = -0.21453$, $A8 = 0.30585$, $A10 = -0.20991$
Aspherical Surface Data of Surface r5

$\epsilon = 0.36507$, $A4 = -0.44642 \times 10^{-1}$, $A6 = 0.12082 \times 10^{-1}$, $A8 = 0.88202 \times 10^{-2}$, $A10 = -0.56296 \times 10^{-2}$
Aspherical Surface Data of Surface r6

$\epsilon = -0.20000 \times 10$, $A4 = -0.14745$, $A6 = 0.32555 \times 10^{-1}$, $A8 = 0.43398 \times 10^{-2}$, $A10 = -0.22720 \times 10^{-2}$
Aspherical Surface Data of Surface r7

$\epsilon = -0.19045 \times 10$, $A4 = -0.97978 \times 10^{-1}$, $A6 = 0.23732 \times 10^{-1}$, $A8 = -0.25696 \times 10^{-2}$, $A10 = -0.40956 \times 10^{-5}$

TABLE 4

Example 4
f = 5.413, FNO = 2.8

| Radius of Curvature | Axial Distance | Refractive Index | Abbe Number |
|---|---|---|---|
| r1* = 3.262 | d1 = 1.267 | N1 = 1.53048 | ν1 = 55.72 (L1) |
| r2* = 20.506 | d2 = 0.605 | | |
| r3 = ∞ (ST) | d3 = 1.011 | | |
| r4* = −2.627 | d4 = 1.329 | N2 = 1.53048 | ν2 = 55.72 (L2) |
| r5* = −1.750 | d5 = 0.100 | | |
| r6* = 6.747 | d6 = 1.769 | N3 = 1.58340 | ν3 = 30.23 (L3) |
| r7* = 2.711 | d7 = 0.500 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = 0.23583, A4 = 0.42634 \times 10^{-2}, A6 = 0.70946 \times 10^{-3},$
$A8 = 0.83522 \times 10^{-4}, A10 = 0.22563 \times 10^{-4}$
Aspherical Surface Data of Surface r2

$\epsilon = 0.13080 \times 10^2, A4 = 0.76363 \times 10^{-2}, A6 = -0.96051 \times 10^{-3},$
$A8 = 0.12099 \times 10^{-2}, A10 = -0.32280 \times 10^{-3}$
Aspherical Surface Data of Surface r4

$\epsilon = 0.14778 \times 10, A4 = 0.46580 \times 10^{-2}, A6 = -0.48590 \times 10^{-1},$
$A8 = 0.29449 \times 10^{-1}, A10 = -0.35940 \times 10^{-2}$
Aspherical Surface Data of Surface r5

$\epsilon = 0.54871, A4 = -0.31360 \times 10^{-1}, A6 = 0.95481 \times 10^{-2},$
$A8 = -0.21117 \times 10^{-2}, A10 = 0.74248 \times 10^{-3}$
Aspherical Surface Data of Surface r6

$\epsilon = 0.35876 \times 10^{-1}, A4 = -0.60741 \times 10^{-1}, A6 = 0.13571 \times 10^{-1},$
$A8 = -0.98325 \times 10^{-3}, A10 = -0.49719 \times 10^{-4}$
Aspherical Surface Data of Surface r7

$\epsilon = -0.54011 \times 10, A4 = -0.17861 \times 10^{-1}, A6 = 0.16540 \times 10^{-3},$
$A8 = 0.11796 \times 10^{-3}, A10 = -0.10468 \times 10^{-4}$

TABLE 5

Example 5
f = 5.414, FNO = 2.8

| Radius of Curvature | Axial Distance | Refractive Index | Abbe Number |
|---|---|---|---|
| r1* = 2.566 | d1 = 1.227 | N1 = 1.53048 | ν1 = 55.72 (L1) |
| r2* = 18.606 | d2 = 0.369 | | |
| r3 = ∞ (ST) | d3 = 0.935 | | |
| r4* = −1.834 | d4 = 1.208 | N2 = 1.53048 | ν2 = 55.72 (L2) |
| r5* = −1.611 | d5 = 0.100 | | |
| r6* = 7.215 | d6 = 1.581 | N3 = 1.58340 | ν3 = 30.23 (L3) |
| r7* = 2.841 | d7 = 0.500 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = 0.16794, A4 = 0.43888 \times 10^{-2}, A6 = 0.28598 \times 10^{-3},$
$A8 = 0.32325 \times 10^{-3}, A10 = -0.24401 \times 10^{-3}$
Aspherical Surface Data of Surface r2

$\epsilon = -0.73024 \times 10, A4 = -0.29787 \times 10^{-2}, A6 = -0.20862 \times 10^{-2},$
$A8 = -0.10682 \times 10^{-2}, A10 = 0.34571 \times 10^{-3}$
Aspherical Surface Data of Surface r4

$\epsilon = 0.12492 \times 10, A4 = 0.29931 \times 10^{-2}, A6 = -0.49256 \times 10^{-1},$
$A8 = 0.23979 \times 10^{-1}, A10 = 0.79079 \times 10^{-3}$
Aspherical Surface Data of Surface r5

$\epsilon = 0.53675, A4 = -0.23290 \times 10^{-1}, A6 = 0.52301 \times 10^{-2},$
$A8 = 0.10769 \times 10^{-2}, A10 = 0.44801 \times 10^{-3}$

TABLE 5-continued

Aspherical Surface Data of Surface r6

$\epsilon = 0.20000 \times 10, A4 = -0.66312 \times 10^{-1}, A6 = 0.15524 \times 10^{-1},$
$A8 = -0.15169 \times 10^{-2}, A10 = -0.38654 \times 10^{-4}$
Aspherical Surface Data of Surface r7

$\epsilon = -0.60000 \times 10, A4 = -0.25548 \times 10^{-1}, A6 = 0.14515 \times 10^{-2},$
$A8 = -0.25702 \times 10^{-4}, A10 = -0.80128 \times 10^{-5}$

TABLE 6

Example 6
f = 3.382, FNO = 2.80

| Radius of Curvature | Axial Distance | Refractive Index | Abbe Number |
|---|---|---|---|
| r1* = −10.748 | d1 = 0.756 | N1 = 1.53048 | ν1 = 55.72 (L1) |
| r2* = −6.165 | d2 = 0.933 | | |
| r3 = ∞ (ST) | d3 = 0.500 | | |
| r4* = −12.672 | d4 = 1.734 | N2 = 1.48749 | ν2 = 70.44 (L2) |
| r5* = −0.898 | d5 = 0.100 | | |
| r6* = 5.623 | d6 = 0.700 | N3 = 1.58340 | ν3 = 30.23 (L3) |
| r7* = 1.145 | d7 = 1.300 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = -0.49000 \times 10^2, A4 = 0.19628 \times 10^{-1}, A6 = 0.42261 \times 10^{-2},$
$A8 = -0.14046 \times 10^{-2}, A10 = 0.24571 \times 10^{-3}$
Aspherical Surface Data of Surface r2

$\epsilon = -0.61499 \times 10, A4 = 0.46300 \times 10^{-1}, A6 = 0.58156 \times 10^{-2},$
$A8 = -0.55287 \times 10^{-2}, A10 = 0.25143 \times 10^{-2}$
Aspherical Surface Data of Surface r4

$\epsilon = -0.10000 \times 10, A4 = -0.36178 \times 10^{-1}, A6 = -0.35359 \times 10^{-1},$
$A8 = 0.33661 \times 10^{-1}, A10 = -0.76906 \times 10^{-1}$
Aspherical Surface Data of Surface r5

$\epsilon = -0.10000 \times 10, A4 = 0.88131 \times 10^{-2}, A6 = -0.10394,$
$A8 = 0.66365 \times 10^{-1}, A10 = -0.21004 \times 10^{-1}$
Aspherical Surface Data of Surface r6

$\epsilon = -0.19193 \times 10, A4 = -0.51842 \times 10^{-1}, A6 = 0.75512 \times 10^{-3},$
$A8 = 0.23514 \times 10^{-2}, A10 = -0.21619 \times 10^{-2}$
Aspherical Surface Data of Surface r7

$\epsilon = -0.45157 \times 10, A4 = -0.44404 \times 10^{-1}, A6 = 0.19663 \times 10^{-1},$
$A8 = -0.73281 \times 10^{-2}, A10 = 0.92529 \times 10^{-3}$

TABLE 7

Example 7
f = 5.403, FNO = 2.80

| Radius of Curvature | Axial Distance | Refractive Index | Abbe Number |
|---|---|---|---|
| r1* = 3.427 | d1 = 1.256 | N1 = 1.58913 | ν1 = 61.28 (L1) |
| r2* = 13.824 | d2 = 0.643 | | |
| r3 = ∞ (ST) | d3 = 0.972 | | |
| r4* = −3.551 | d4 = 1.640 | N2 = 1.53048 | ν2 = 55.72 (L2) |
| r5* = −1.328 | d5 = 0.100 | | |
| r6* = −31.222 | d6 = 1.584 | N3 = 1.58340 | ν3 = 30.23 (L3) |
| r7* = 2.125 | d7 = 0.800 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = 0.45664, A4 = 0.50687 \times 10^{-2}, A6 = 0.84990 \times 10^{-3},$
$A8 = -0.13419 \times 10^{-4}, A10 = 0.45261 \times 10^{-4}$ TABLE 7-continued Aspherical Surface Data of Surface r2

$\epsilon = 0.13638 \times 10^2$, $A4 = 0.12538 \times 10^{-1}$, $A6 = -0.40314 \times 10^{-2}$,
$A8 = 0.29052 \times 10^{-2}$, $A10 = -0.63264 \times 10^{-3}$
Aspherical Surface Data of Surface r4

$\epsilon = 0.20000 \times 10$, $A4 = -0.17811 \times 10^{-1}$, $A6 = -0.44803 \times 10^{-1}$,
$A8 = 0.25403 \times 10^{-1}$, $A10 = -0.27515 \times 10^{-2}$
Aspherical Surface Data of Surface r5

$\epsilon = 0.28496$, $A4 = -0.90398 \times 10^{-3}$, $A6 = 0.58812 \times 10^{-2}$,
$A8 = -0.40268 \times 10^{-2}$, $A10 = 0.10098 \times 10^{-2}$
Aspherical Surface Data of Surface r6

$\epsilon = 0.0$, $A4 = -0.60414 \times 10^{-1}$, $A6 = 0.15910 \times 10^{-1}$,
$A8 = -0.10850 \times 10^{-2}$, $A10 = -0.90198 \times 10^{-4}$
Aspherical Surface Data of Surface r7

$\epsilon = -0.52095 \times 10$, $A4 = -0.30068 \times 10^{-1}$, $A6 = 0.30856 \times 10^{-2}$,
$A8 = -0.17047 \times 10^{-3}$, $A10 = 0.10885 \times 10^{-6}$

TABLE 8

Example 8
f = 4.212, FNO = 4.00

| Radius of Curvature | Axial Distance | Refractive Index | Abbe Number |
|---|---|---|---|
| r1* = 1.823 | d1 = 1.195 | N1 = 1.48749 | ν1 = 70.44 (L1) |
| r2* = 17.003 | d2 = 0.300 | | |
| r3 = ∞ (ST) | d3 = 0.575 | | |
| r4* = -1.231 | d4 = 1.371 | N2 = 1.53048 | ν2 = 55.72 (L2) |
| r5* = -0.881 | d5 = 0.100 | | |
| r6* = 4.980 | d6 = 0.749 | N3 = 1.58340 | ν3 = 30.23 (L3) |
| r7* = 1.193 | d7 = 0.500 | | |
| r8 = ∞ | d8 = 0.500 | N4 = 1.51680 | ν4 = 64.20 (GF) |
| r9 = ∞ | | | |

Aspherical Surface Data of Surface r1

$\epsilon = 0.41144$, $A4 = 0.85264 \times 10^{-2}$, $A6 = 0.61779 \times 10^{-2}$,
$A8 = -0.18563 \times 10^{-2}$, $A10 = -0.12302 \times 10^{-2}$
Aspherical Surface Data of Surface r2

$\epsilon = 0.16000 \times 10^2$, $A4 = -0.94292 \times 10^{-2}$, $A6 = -0.39468 \times 10^{-1}$,
$A8 = 0.43553 \times 10^{-1}$, $A10 = -0.19370 \times 10^{-1}$
Aspherical Surface Data of Surface r4

$\epsilon = 0.19571 \times 10$, $A4 = -0.22360 \times 10^{-1}$, $A6 = -0.23890$, $A8 = 0.29336$, $A10 = 0.36819$
Aspherical Surface Data of Surface r5

$\epsilon = 0.66179 \times 10^{-1}$, $A4 = 0.59525 \times 10^{-1}$, $A6 = -0.70445 \times 10^{-1}$,
$A8 = 0.15571 \times 10^{-1}$, $A10 = 0.54156 \times 10^{-2}$
Aspherical Surface Data of Surface r6

$\epsilon = 0.12482 \times 10$, $A4 = -0.14933$, $A6 = 0.56598 \times 10^{-1}$,
$A8 = -0.76101 \times 10^{-2}$, $A10 = -0.24802 \times 10^{-4}$
Aspherical Surface Data of Surface r7

$\epsilon = -0.60000 \times 10$, $A4 = -0.74292 \times 10^{-1}$, $A6 = 0.64193 \times 10^{-2}$,
$A8 = 0.15186 \times 10^{-2}$, $A10 = -0.29432 \times 10^{-3}$

TABLE 9

Example 9
f = 7.277, FNO = 4.00

| Radius of Curvature | Axial Distance | Refractive Index | Abbe Number |
|---|---|---|---|
| r1* = 3.548 | d1 = 1.161 | N1 = 1.58913 | ν1 = 61.28 (L1) |
| r2* = 16.802 | d2 = 0.593 | | |

TABLE 9-continued

| | | | |
|---|---|---|---|
| r3 = ∞ (ST) | d3 = 1.343 | | |
| r4* = -3.817 | d4 = 1.377 | N2 = 1.53048 | ν2 = 55.72 (L2) |
| r5* = -1.576 | d5 = 0.447 | | |
| r6* = -2.730 | d6 = 1.686 | N3 = 1.58340 | ν3 = 30.23 (L3) |
| r7 = -4.280 | d7 = 0.100 | | |
| r8 = -5.779 | d8 = 0.833 | N4 = 1.53048 | ν4 = 55.72 (L4) |
| r9* = 5.219 | d9 = 0.500 | | |
| r10 = ∞ | d10 = 0.700 | N5 = 1.51680 | ν5 = 64.20 (GF) |
| r11 = ∞ | | | |

Aspherical Surface Data of Surface r1

$\epsilon = 0.77503$, $A4 = 0.25359 \times 10^{-2}$, $A6 = 0.42096 \times 10^{-3}$,
$A8 = 0.12178 \times 10^{-4}$, $A10 = 0.88312 \times 10^{-5}$
Aspherical Surface Data of Surface r2

$\epsilon = 0.16000 \times 10^2$, $A4 = 0.60134 \times 10^{-2}$, $A6 = -0.12266 \times 10^{-2}$,
$A8 = 0.58101 \times 10^{-3}$, $A10 = -0.11992 \times 10^{-3}$
Aspherical Surface Data of Surface r4

$\epsilon = 0.20000 \times 10$, $A4 = -0.23442 \times 10^{-1}$, $A6 = -0.78672 \times 10^{-2}$,
$A8 = 0.75751 \times 10^{-2}$, $A10 = -0.35641 \times 10^{-3}$
Aspherical Surface Data of Surface r5

$\epsilon = 0.26692$, $A4 = -0.38537 \times 10^{-2}$, $A6 = 0.64572 \times 10^{-3}$,
$A8 = -0.20007 \times 10^{-3}$, $A10 = 0.48166 \times 10^{-3}$
Aspherical Surface Data of Surface r6

$\epsilon = 0.19644 \times 10^{-1}$, $A4 = -0.20508 \times 10^{-1}$, $A6 = 0.58512 \times 10^{-2}$,
$A8 = -0.43953 \times 10^{-4}$, $A10 = -0.11200 \times 10^{-3}$
Aspherical Surface Data of Surface r9

$\epsilon = -0.24561 \times 10$, $A4 = -0.14117 \times 10^{-1}$, $A6 = 0.65211 \times 10^{-3}$,
$A8 = -0.11832 \times 10^{-4}$, $A10 = -0.56001 \times 10^{-6}$

TABLE 10

Example 10
f = 7.224, FNO = 4.00

| Radius of Curvature | Axial Distance | Refractive Index | Abbe Number |
|---|---|---|---|
| r1* = 3.085 | d1 = 1.254 | N1 = 1.48749 | ν1 = 70.44 (L1) |
| r2* = 132.361 | d2 = 0.519 | | |
| r3 = ∞ (ST) | d3 = 1.333 | | |
| r4* = -2.840 | d4 = 1.370 | N2 = 1.53048 | ν2 = 55.72 (L2) |
| r5* = -1.406 | d5 = 0.215 | | |
| r6* = -2.977 | d6 = 1.421 | N3 = 1.58340 | ν3 = 30.23 (L3) |
| r7 = -4.231 | d7 = 0.200 | | |
| r8* = -3.893 | d8 = 0.929 | N4 = 1.53048 | ν4 = 55.72 (L4) |
| r9* = -4.977 | d9 = 0.500 | | |
| r10 = ∞ | d10 = 0.700 | N5 = 1.51680 | ν5 = 64.20 (GF) |
| r11 = ∞ | | | |

Aspherical Surface Data of Surface r1

$\epsilon = 0.53903$, $A4 = 0.16932 \times 10^{-2}$, $A6 = -0.11741 \times 10^{-3}$,
$A8 = 0.57949 \times 10^{-4}$, $A10 = -0.71896 \times 10^{-4}$
Aspherical Surface Data of Surface r2

$\epsilon = -0.14000 \times 10^{-2}$, $A4 = 0.27334 \times 10^{-2}$, $A6 = -0.26419 \times 10^{-2}$,
$A8 = -0.75325 \times 10^{-4}$, $A10 = 0.73080 \times 10^{-4}$
Aspherical Surface Data of Surface r4

$\epsilon = 0.20000 \times 10$, $A4 = -0.31677 \times 10^{-1}$, $A6 = -0.75942 \times 10^{-2}$,
$A8 = 0.91685 \times 10^{-2}$, $A10 = 0.41558 \times 10^{-3}$
Aspherical Surface Data of Surface r5

$\epsilon = 0.24552$, $A4 = -0.52179 \times 10^{-2}$, $A6 = 0.25889 \times 10^{-2}$,
$A8 = 0.68847 \times 10^{-4}$, $A10 = 0.47898 \times 10^{-3}$
Aspherical Surface Data of Surface r6

$\epsilon = 0.40102 \times 10^{-1}$, $A4 = -0.18898 \times 10^{-1}$, $A6 = 0.54964 \times 10^{-2}$,
$A8 = 0.32997 \times 10^{-3}$, $A10 = -0.26481 \times 10^{-3}$ TABLE 10-continued Aspherical Surface Data of Surface r8

$\epsilon = 0.10000 \times 10$, $A4 = 0.48378 \times 10^{-3}$, $A6 = 0.60634 \times 10^{-3}$,
$A8 = 0.19793 \times 10^{-4}$, $A10 = -0.16558 \times 10^{-5}$ Aspherical Surface Data of Surface r9

$\epsilon = -0.60000 \times 10$, $A4 = -0.16306 \times 10^{-1}$, $A6 = 0.98140 \times 10^{-3}$,
$A8 = -0.41108 \times 10^{-4}$, $A10 = 0.65479 \times 10^{-6}$

TABLE 11

Example 11
f = 7.223, FNO = 3.20

| | Radius of Curvature | Axial Distance | Refractive Index | Abbe Number |
|---|---|---|---|---|
| r1* = | 3.658 | d1 = 1.456 | N1 = 1.48749 | ν1 = 70.44 (L1) |
| r2* = | 73.204 | d2 = 0.709 | | |
| r3 = | ∞ (ST) | d3 = 1.347 | | |
| r4* = | -3.303 | d4 = 1.559 | N2 = 1.53048 | ν2 = 55.72 (L2) |
| r5* = | -1.519 | d5 = 0.100 | | |
| r6* = | -5.135 | d6 = 1.559 | N3 = 1.58340 | ν3 = 30.23 (L3) |
| r7 = | -8.750 | d7 = 0.200 | | |
| r8* = | -7.043 | d8 = 1.264 | N4 = 1.53048 | ν4 = 55.72 (L4) |
| r9* = | 3.768 | d9 = 0.500 | | |
| r10 = | ∞ | d10 = 0.700 | N5 = 1.51680 | ν5 = 64.20 (GF) |
| r11 = | ∞ | | | |

Aspherical Surface Data of Surface r1

$\epsilon = 0.71501$, $A4 = 0.28518 \times 10^{-2}$, $A6 = -0.17675 \times 10^{-3}$,
$A8 = 0.14775 \times 10^{-3}$, $A10 = -0.18376 \times 10^{-4}$ Aspherical Surface Data of Surface r2

$\epsilon = 0.16000 \times 10^{2}$, $A4 = 0.63737 \times 10^{-2}$, $A6 = -0.12019 \times 10^{-2}$,
$A8 = 0.11025 \times 10^{-3}$, $A10 = -0.14631 \times 10^{-4}$ Aspherical Surface Data of Surface r4

$\epsilon = 0.17392 \times 10$, $A4 = -0.19887 \times 10^{-1}$, $A6 = -0.18654 \times 10^{-1}$,
$A8 = 0.10823 \times 10^{-1}$, $A10 = -0.98268 \times 10^{-3}$ Aspherical Surface Data of Surface r5

$\epsilon = 0.25841$, $A4 = -0.41793 \times 10^{-3}$, $A6 = -0.20223 \times 10^{-3}$,
$A8 = -0.33463 \times 10^{-3}$, $A10 = 0.23695 \times 10^{-3}$ Aspherical Surface Data of Surface r6

$\epsilon = 0.00000$, $A4 = -0.14443 \times 10^{-1}$, $A6 = 0.39292 \times 10^{-2}$,
$A8 = -0.46118 \times 10^{-4}$, $A10 = -0.77163 \times 10^{-4}$ Aspherical Surface Data of Surface r8

$\epsilon = 0.10000 \times 10$, $A4 = 0.39723 \times 10^{-3}$, $A6 = 0.28397 \times 10^{-3}$,
$A8 = 0.18192 \times 10^{-5}$, $A10 = -0.45178 \times 10^{-6}$ Aspherical Surface Data of Surface r9

$\epsilon = -0.55782 \times 10$, $A4 = -0.11687 \times 10^{-1}$, $A6 = 0.76776 \times 10^{-3}$,
$A8 = -0.49279 \times 10^{-4}$, $A10 = 0.13179 \times 10^{-5}$

TABLE 12

Example 12
f = 5.457, FNO = 3.20

| | Radius of Curvature | Axial Distance | Refractive Index | Abbe Number |
|---|---|---|---|---|
| r1* = | 3.253 | d1 = 1.288 | N1 = 1.48749 | ν1 = 70.44 (L1) |
| r2* = | -86.056 | d2 = 0.579 | | |
| r3 = | ∞ (ST) | d3 = 1.036 | | |
| r4* = | -2.672 | d4 = 1.199 | N2 = 1.53048 | ν2 = 55.72 (L2) |
| r5* = | -1.179 | d5 = 0.100 | | |
| r6* = | -4.423 | d6 = 1.022 | N3 = 1.58340 | ν3 = 30.23 (L3) |
| r7 = | -7.099 | d7 = 0.200 | | |
| r8* = | -6.526 | d8 = 0.956 | N4 = 1.53048 | ν4 = 55.72 (L4) |
| r9* = | 2.573 | d9 = 0.500 | | |
| r10 = | ∞ | d10 = 0.500 | N5 = 1.51680 | ν5 = 64.20 (GF) |
| r11 = | ∞ | | | |

Aspherical Surface Data of Surface r1

$\epsilon = 0.61954$, $A4 = 0.60178 \times 10^{-2}$, $A6 = -0.12105 \times 10^{-2}$,
$A8 = 0.86233 \times 10^{-3}$, $A10 = -0.15712 \times 10^{-3}$ Aspherical Surface Data of Surface r2

$\epsilon = -0.14000 \times 10^{2}$, $A4 = 0.15001 \times 10^{-1}$, $A6 = -0.53033 \times 10^{-2}$,
$A8 = 0.12331 \times 10^{-2}$, $A10 = -0.29962 \times 10^{-3}$ Aspherical Surface Data of Surface r4

$\epsilon = 0.11867 \times 10$, $A4 = -0.37808 \times 10^{-1}$, $A6 = -0.76004 \times 10^{-1}$,
$A8 = 0.79954 \times 10^{-1}$, $A10 = -0.14867 \times 10^{-1}$ Aspherical Surface Data of Surface r5

$\epsilon = 0.25855$, $A4 = 0.51279 \times 10^{-3}$, $A6 = -0.23878 \times 10^{-2}$,
$A8 = -0.21119 \times 10^{-2}$, $A10 = 0.31651 \times 10^{-2}$ Aspherical Surface Data of Surface r6

$\epsilon = 0.69924$, $A4 = -0.37699 \times 10^{-1}$, $A6 = 0.16425 \times 10^{-1}$,
$A8 = -0.53665 \times 10^{-3}$, $A10 = -0.77077 \times 10^{-3}$ Aspherical Surface Data of Surface r8

$\epsilon = 0.10000 \times 10$, $A4 = 0.22716 \times 10^{-3}$, $A6 = 0.10393 \times 10^{-2}$,
$A8 = 0.34646 \times 10^{-5}$, $A10 = -0.42799 \times 10^{-5}$ Aspherical Surface Data of Surface r9

$\epsilon = -0.56964 \times 10$, $A4 = -0.26810 \times 10^{-1}$, $A6 = 0.32076 \times 10^{-2}$,
$A8 = -0.37062 \times 10^{-3}$, $A10 = 0.17192 \times 10^{-4}$

TABLE 13

| | (1), (1a), (1b) f/Y' |
|---|---|
| Example 1 | 1.46 |
| Example 2 | 1.69 |
| Example 3 | 1.69 |
| Example 4 | 1.64 |
| Example 5 | 1.64 |
| Example 6 | 1.47 |
| Example 7 | 1.64 |
| Example 8 | 1.68 |
| Example 9 | 1.65 |
| Example 10 | 1.64 |
| Example 11 | 1.64 |
| Example 12 | 1.65 |

What is claimed is:

1. A taking lens system for forming an image on a solid-state image sensor, comprising, from an object side:

two positive lens elements;

at least one negative lens element, wherein a most image-side lens surface is an aspherical surface concave to an image side, the aspherical surface having a point of inflection; and the following condition is fulfilled:

$$1.1 < f/Y' < 1.9$$

where f represents a focal length of the entire taking lens system; and Y' represents a maximum image height.

2. A taking lens system for forming an image on a solid-state image sensor, comprising, from an object side:

a positive lens element;

an aperture stop;

a lens unit composed of at least one lens element, wherein a most image-side lens element within the lens unit is a negative lens element concave to an image side, the negative lens element having an aspherical surface on an image side thereof, the aspherical surface having a point of inflection; and the following condition is fulfilled:

$$1.1 \leq f/Y' < 1.9$$

where f represents a focal length of the entire taking lens system; and Y' represents a maximum image height.

3. A taking lens system for forming an image on a solid-state image sensor, comprising, from an object side:

a positive lens element;

an aperture stop; and a lens unit composed of at least one lens element, wherein a most image-side lens surface within the lens unit is an aspherical surface concave to an image side, the aspherical surface having a point of inflection, and the following condition is fulfilled:

$$1.1 < f/Y' < 1.9$$

where f represents a focal length of the entire taking lens system; and

Y' represents a maximum image height.

* * * * *